US012663132B2

(12) United States Patent
Shimizu et al.

(10) Patent No.: US 12,663,132 B2
(45) Date of Patent: Jun. 23, 2026

(54) VEHICLE LAMP

(71) Applicant: STANLEY ELECTRIC CO., LTD.,
Tokyo (JP)

(72) Inventors: Akio Shimizu, Tokyo (JP); Shinnosuke Kuroda, Tokyo (JP); Jimman Kong, Tokyo (JP)

(73) Assignee: STANLEY ELECTRIC CO., LTD.,
Tokyo (JP)

( * ) Notice: Subject to any disclaimer, the term of this patent is extended or adjusted under 35 U.S.C. 154(b) by 0 days.

(21) Appl. No.: 19/237,585

(22) Filed: Jun. 13, 2025

(65) Prior Publication Data

US 2025/0389414 A1 Dec. 25, 2025

(30) Foreign Application Priority Data

Jun. 21, 2024 (JP) ................................. 2024-100095

(51) Int. Cl.
| | |
|---|---|
| *F21S 41/19* | (2018.01) |
| *B60Q 1/00* | (2006.01) |
| *F21S 41/141* | (2018.01) |
| *F21S 43/14* | (2018.01) |
| *F21S 43/19* | (2018.01) |
| *F21S 45/47* | (2018.01) |
| *F21V 23/00* | (2015.01) |
| *F21Y 115/10* | (2016.01) |

(52) U.S. Cl.
CPC .......... *F21S 41/192* (2018.01); *B60Q 1/0088* (2013.01); *F21S 41/141* (2018.01); *F21S 43/14* (2018.01); *F21S 43/195* (2018.01); *F21S 45/47* (2018.01); *F21V 23/002* (2013.01); *F21Y 2115/10* (2016.08)

(58) Field of Classification Search
CPC . F21S 45/47; F21S 45/48; F21S 45/49; B60Q 1/0088
See application file for complete search history.

(56) References Cited

U.S. PATENT DOCUMENTS

| | | | |
|---|---|---|---|
| 2016/0047519 A1* | 2/2016 | Shibata ................... | F21S 45/48 |
| | | | 362/512 |
| 2016/0091164 A1* | 3/2016 | Mornet ................... | F21S 45/48 |
| | | | 362/547 |
| 2019/0271457 A1* | 9/2019 | Aoki ..................... | F21S 41/148 |
| 2021/0178991 A1* | 6/2021 | King ................... | B60Q 1/0094 |

FOREIGN PATENT DOCUMENTS

WO 2021/153233 A1 8/2021

* cited by examiner

*Primary Examiner* — Alexander K Garlen
(74) *Attorney, Agent, or Firm* — Kenealy Vaidya LLP

(57) ABSTRACT

A vehicle lamp includes a bracket; a heat-sink supported by the bracket; a first-board supported by the bracket and on which a first-light-emitting-element is mounted on one surface of the first-board; a second-board supported by the heat-sink, on which a second-light-emitting-element is mounted on one surface of the second-board, and that irradiates light in a first direction; and a first cable supported by the first-board. The bracket has a first cable support portion and a second cable support portion, the first cable support portion supporting the first cable on one side in a second direction orthogonal to the first direction, and the second cable support portion supporting the first cable on the other side in the second direction. The first cable is supported to the bracket by the first cable support portion and the second cable support portion via a gap between the first cable and the heat-sink.

7 Claims, 5 Drawing Sheets

VEHICLE LAMP

CROSS-REFERENCE TO RELATED APPLICATION

Priority is claimed on Japanese Patent Application No. 2024-100095, filed Jun. 21, 2024, the content of which is incorporated herein by reference.

BACKGROUND OF THE INVENTION

Field of the Invention

The present invention relates to a vehicle lamp.

Description of Related Art

In recent vehicle lamps, light emitting elements such as light emitting diodes (LEDs) have been used as light sources. A light emitting diode may be cooled by a heat sink because a high temperature will cause deterioration in light-emitting efficiency or will shorten the lifespan thereof. PCT International Publication No. WO2021/153233 discloses a vehicle lamp provided with a heat sink for cooling a circuit board on a rearward side behind the circuit board having a light emitting element mounted thereon.

SUMMARY OF THE INVENTION

A heat sink may have sharp corner parts to secure a surface area. In addition, the temperature of a heat sink is high during heat dissipation. For this reason, there is concern that a cable connected to a light source device may be damaged if the cable comes into contact with a heat sink.

An aspect of the present invention provides a vehicle lamp in which damage to a cable can be suppressed.

The aspect of the present invention provides the following constitutions.

[1] A vehicle lamp includes a bracket; a heat sink supported by the bracket; a first board that is supported by the bracket and on which a first light emitting element is mounted on one surface of the first board; a second board that is supported by the heat sink, on which a second light emitting element is mounted on one surface of the second board, and that irradiates light in a first direction; and a first cable supported by the first board. The bracket has a first cable support portion and a second cable support portion, the first cable support portion supporting the first cable on one side in a second direction orthogonal to the first direction, and the second cable support portion supporting the first cable on the other side in the second direction. The first cable is supported to the bracket by the first cable support portion and the second cable support portion via a gap between the first cable and the heat sink.

[2] In the vehicle lamp according to [1], the first cable support portion has a first cutout portion into which the first cable is inserted. The second cable support portion has a second cutout portion into which the first cable is inserted. An opening direction of the first cutout portion and an opening direction of the second cutout portion are directions intersecting each other.

[3] In the vehicle lamp according to [2], the second cable support portion has a first protruding portion and a second protruding portion protruding in a same direction with each other, and the second cutout portion is formed between the first protruding portion and the second protruding portion.

The first protruding portion and the second protruding portion are disposed while being shifted in the second direction.

[4] In the vehicle lamp according to [3], the first cutout portion opens upward and supports the first cable from below. The first protruding portion is positioned between the first cutout portion and the second protruding portion in the second direction and supports the first cable from above. The second protruding portion supports the first cable from below.

[5] The vehicle lamp according to [1] further includes a second cable supported by the second board, and a terminal portion connected to a connector portion. The first cable is bundled with the second cable at a tip side compared to parts supported by the first cable support portion and the second cable support portion and is connected to the terminal portion together with the second cable.

[6] In the vehicle lamp according to [1], the bracket has a recessed portion recessed in the first direction, and the first cable support portion and the second cable support portion which are positioned on one side and other side of the recessed portion respectively in the second direction and which protrude to an opposite side of a recess direction of the recessed portion. The heat sink is disposed while being accommodated in the recessed portion.

[7] In the vehicle lamp according to [1], a wire portion of the first cable laid between the first cable support portion and the second cable support portion is positioned on one side in the first direction with respect to the heat sink.

As above, according to the aspect of the present invention, a vehicle lamp in which damage to a cable can be suppressed is provided.

DETAILED DESCRIPTION OF THE INVENTION

Figure 1:
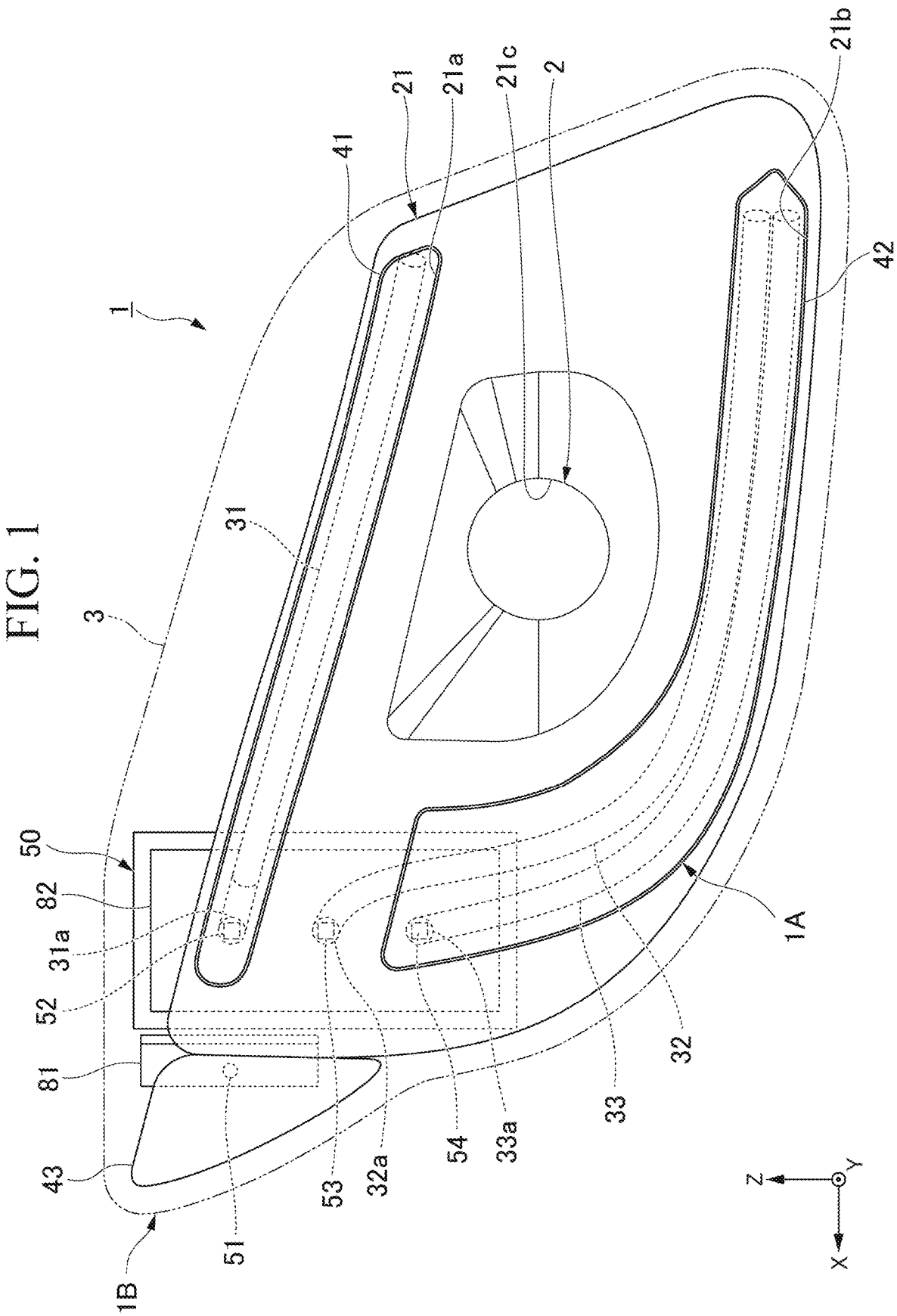
FIG. 1 is a front view of a vehicle lamp of an embodiment.

Hereinafter, an embodiment of the present invention will be described in detail with reference to the drawings.

In the drawings used in the following description, in order to make each of constituent elements easier to see, dimensions may be shown on a different scale depending on the constituent element, and the dimensional ratios and the like of each of the constituent elements are not necessarily the same as the actual values.

In addition, XYZ coordinates are suitably shown in each diagram. A Y axis indicates a forward-rearward direction (first direction) of a vehicle having a vehicle lamp 1 mounted therein, in which a positive Y side (first side) is the forward side and a negative Y side (second side) opposite to the positive Y side is the rearward side. An X axis direction is a lateral direction (second direction) of the vehicle, in which a positive X side is the right side and a negative X side is the left side. A Z axis direction is a vertical direction, in which a positive Z side is the upward side and a negative Z side is the downward side. The posture in which the vehicle lamp 1 is assembled with respect to the vehicle is not limited to those in the present embodiment.

Figure 2:
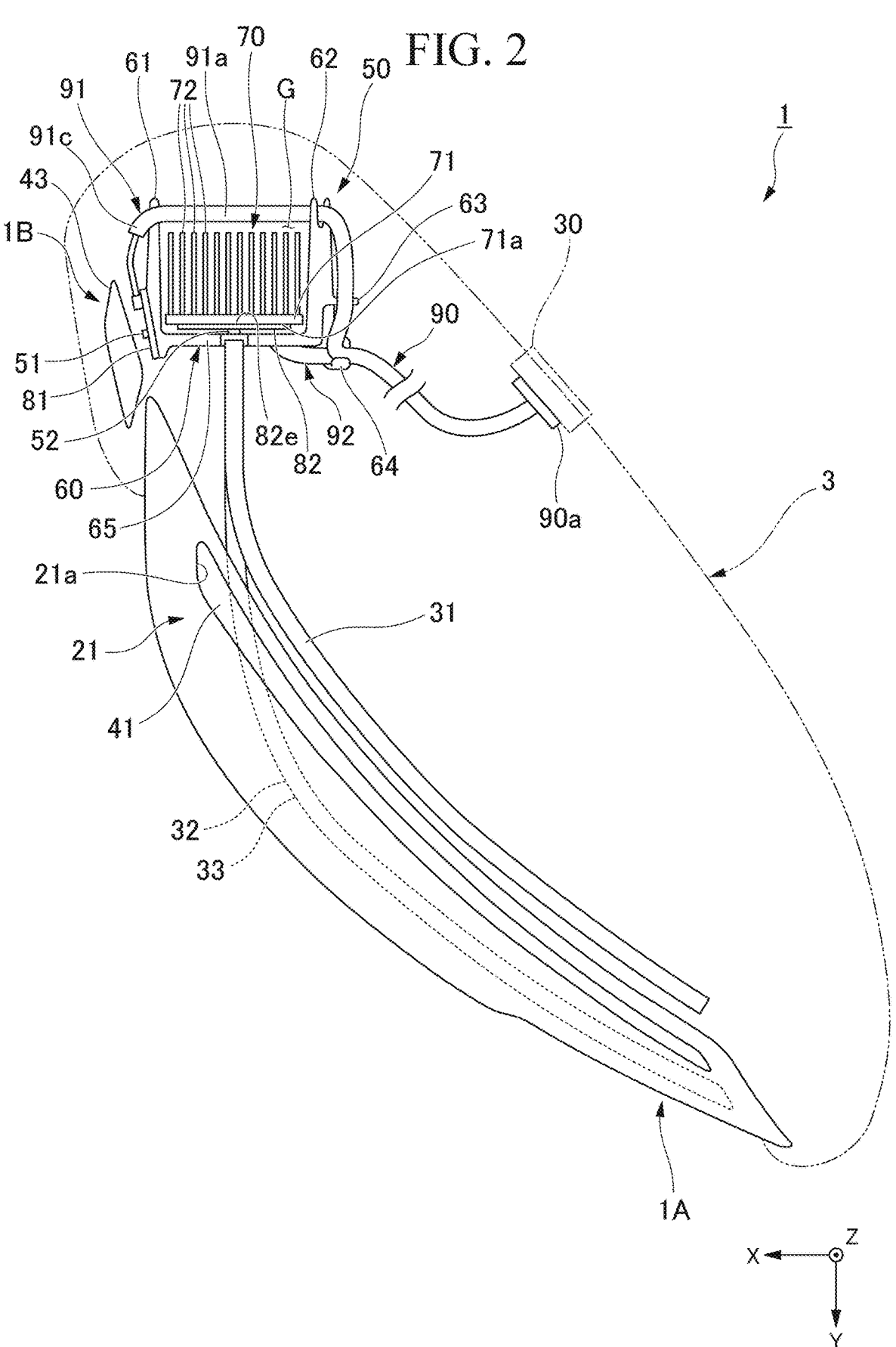
FIG. 2 is a plan view of the vehicle lamp of the embodiment.

FIG. 1 is a front view of the vehicle lamp 1 of the present embodiment. FIG. 2 is a plan view of the vehicle lamp 1. For example, the vehicle lamp 1 of the present embodiment is realized by applying the present invention to front combination lamps (headlight units) mounted in both corner portions of a vehicle (not shown) on the front end side (a corner portion on the right front end side in the present embodiment). The front combination lamp of the present embodiment is a lamp unit having a headlamp unit 2, a tri-function type first lamp 1A, and a second lamp 1B functioning as a side marker. The tri-function type first lamp 1A has three main functions, such as a daytime running lamp (DRL) emitting white light during the day, a side marker lamp (position lamp) emitting white light at night, and a direction indicator (turn lamp) emitting orange light and flashing.

In the following description, in a pair of headlights mounted in a vehicle, the vehicle lamp 1 mounted on the right side (+X) of the vehicle will be described. The vehicle lamp 1, of the pair of headlights, mounted on the left side (−X) of the vehicle has a configuration inverted in the lateral direction X with respect to the following description.

As shown in FIG. 1, the vehicle lamp 1 has the headlamp unit 2, a light source device 50, an extension 21, a first light guide body 31, a second light guide body 32, a third light guide body 33, a first inner lens 41, a second inner lens 42, a third inner lens 43, and a housing 3 supporting these.

As shown in FIG. 2, the extension 21 has a plate shape extending in a manner of being inclined in a direction in which it is positioned further toward the right side (+X) as it goes toward the rearward side (−Y). The extension 21 is disposed on the forward side (+Y) from the light source device 50, the first light guide body 31, the second light guide body 32, and the third light guide body 33.

As shown in FIG. 1, the extension 21 is provided with a first opening hole 21a, a second opening hole 21b, and a third opening hole 21c. The first opening hole 21a is covered by the first inner lens 41. The second opening hole 21b is covered by the second inner lens 42. The headlamp unit 2 is disposed in the third opening hole 21c. The headlamp unit 2 performs irradiation with light to the forward side (+Y) through the third opening hole 21c.

Each of the first inner lens 41, the second inner lens 42, and the third inner lens 43 is constituted using a transparent resin material or glass. The first inner lens 41 is disposed on the forward side of the first light guide body 31, diffuses light emitted from the first light guide body 31, and emits it to the forward side (+Y) and the right side (+X). The second inner lens 42 is disposed on the forward side (+Y) of the second light guide body 32 and the third light guide body 33, diffuses light emitted from the second light guide body 32 and the third light guide body 33, and emits it to the forward side (+Y) and the right side (+X).

As shown in FIG. 2, the third inner lens 43 has a plate shape. The third inner lens 43 extends along a plane orthogonal to the lateral direction X. The third inner lens 43 is disposed on the rearward side (−Y) of the extension 21. In addition, the third inner lens 43 is disposed on the right side (+X) of the light source device 50. The third inner lens 43 faces a first light emitting element 51 of the light source device 50 in the lateral direction X. The third inner lens 43 diffuses light emitted from the first light emitting element 51 and emits it to the right side (+X).

Each of the first light guide body 31, the second light guide body 32, and the third light guide body 33 has a rod shape curving in an arch shape in a direction toward the left side (−X) as it goes toward the forward side (+Y). The first light guide body 31, the second light guide body 32, and the third light guide body 33 of the present embodiment have a substantially circular cross-sectional shape. The first light guide body 31, the second light guide body 32, and the third light guide body 33 are made of, for example, a light transmitting material such as polycarbonate, a transparent resin, or glass.

As shown in FIG. 1, incidence portions 31a, 32a, and 33a are provided in rear end portions of the first light guide body 31, the second light guide body 32, and the third light guide body 33, respectively. The incidence portion 31a of the first light guide body 31 faces a second light emitting element 52 and guides light emitted from the second light emitting element 52 into the first light guide body 31. The incidence portion 32a of the second light guide body 32 faces a third light emitting element 53 and guides light emitted from the third light emitting element 53 into the second light guide body 32. The incidence portion 33a of the third light guide body 33 faces a fourth light emitting element 54 and guides light emitted from the fourth light emitting element 54 into the third light guide body 33. The light guided into the first light guide body 31, the second light guide body 32, and the third light guide body 33 is emitted substantially uniformly toward the forward side (+Y) and the right side (+X) from the entire lengths of the light guide bodies due to the effect of reflective cuts (not shown) provided in each of the light guide bodies. Accordingly, the first light guide body 31, the second light guide body 32, and the third light guide body 33 emit light substantially uniformly over their entire lengths.

Figure 3:
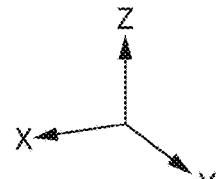
FIG. 3 is a perspective view of a light source device according to the vehicle lamp of the embodiment viewed obliquely from the front.

FIG. 3 is a perspective view of the light source device 50 viewed obliquely from the front.

The light source device 50 includes a first board 81, a second board 82, a first cable 91, a second cable 92, a bracket 60, and a heat sink 70.

The first board 81 has the first light emitting element 51 and a first connector portion 81b. The first board 81 of the present embodiment is a rigid board. The first board 81 may be a flexible board. The first board 81 is positioned on the left side (−X) of the third inner lens 43 and is disposed along the third inner lens 43. The first board 81 extends along a plane orthogonal to the lateral direction X and extends in a manner of being slightly inclined in a direction in which it is positioned further toward the right side (+X) as it goes toward the rearward side (−Y). The first board 81 has a front surface serving as a mounting surface 81f directed to the right side (+X) and a fixed surface 81e directed to a side opposite thereto, and the mounting surface 81f faces the third inner lens 43.

The first light emitting element 51 and the first connector portion 81b are mounted on the mounting surface 81f of the first board 81. The first light emitting element 51 functions as a light source for the side marker. The first light emitting element 51 of the present embodiment is a light emitting diode (LED), but it is not limited to this.

The first cable 91 is connected to the first connector portion 81b. Accordingly, the first cable 91 is supported by the first board 81. The first cable 91 supplies power to the first board 81. The first cable 91 is routed to the forward side (+Y) of the second board 82 through the rearward side (−Y) of the heat sink 70 and the left side (−X) of the second board 82. A heat-resistant cover 91c is provided in a part passing the rearward side (−Y) of the heat sink 70 of the first cable 91 of the present embodiment. The heat-resistant cover 91c protects the first cable 91 from heat of the heat sink 70. The heat-resistant cover 91c is not essential, and the heat-resistant cover 91c may be omitted in such a case in which a sufficient distance can be secured between the first cable 91 and the heat sink 70.

The second board 82 has the second light emitting element 52, the third light emitting element 53, the fourth light emitting element 54, and a second connector portion 82b. A board main body 82a of the second board 82 of the present embodiment is a rigid board. The second board 82 may be a flexible board. The second board 82 is positioned on the left side (−X) with respect to the first board 81. The second board 82 extends along a plane orthogonal to the forward-rearward direction Y. The second board 82 has a mounting surface 82f directed to the forward side (+Y), and a cooled surface 82e directed to the rearward side (−Y).

The second light emitting element 52, the third light emitting element 53, the fourth light emitting element 54, and the second connector portion 82b are mounted on the mounting surface 82f of the second board 82. The second light emitting element 52, the third light emitting element 53, the fourth light emitting element 54, and the second connector portion 82b are disposed side by side in the upward-downward direction Z. The second light emitting element 52, the third light emitting element 53, and the fourth light emitting element 54 function as light sources for the tri-function type first lamp 1A. The second light emitting element 52, the third light emitting element 53, and the fourth light emitting element 54 of the present embodiment are light emitting diodes (LED), but they are not limited to this.

The second cable 92 is connected to the second connector portion 82b. Accordingly, the second cable 92 is supported by the second board 82. The second cable 92 supplies power to the second board 82. The second cable 92 is routed to the left side (−X) from the second connector portion 82b on the forward side (+Y) of the second board 82. The first cable 91 and the second cable 92 are joined and bundled on the forward side (+Y) of the second board 82. In the following description, a cable in a state in which the first cable 91 and the second cable 92 are bundled will be referred to as a cable bundle 90. A terminal portion 90a is provided in a tip portion of the cable bundle 90. As shown in FIG. 2, the cable bundle 90 is routed inside the housing 3. The terminal portion 90a of the cable bundle 90 is connected to a connector portion 30 provided on an inward side surface of the housing 3.

Figure 4:
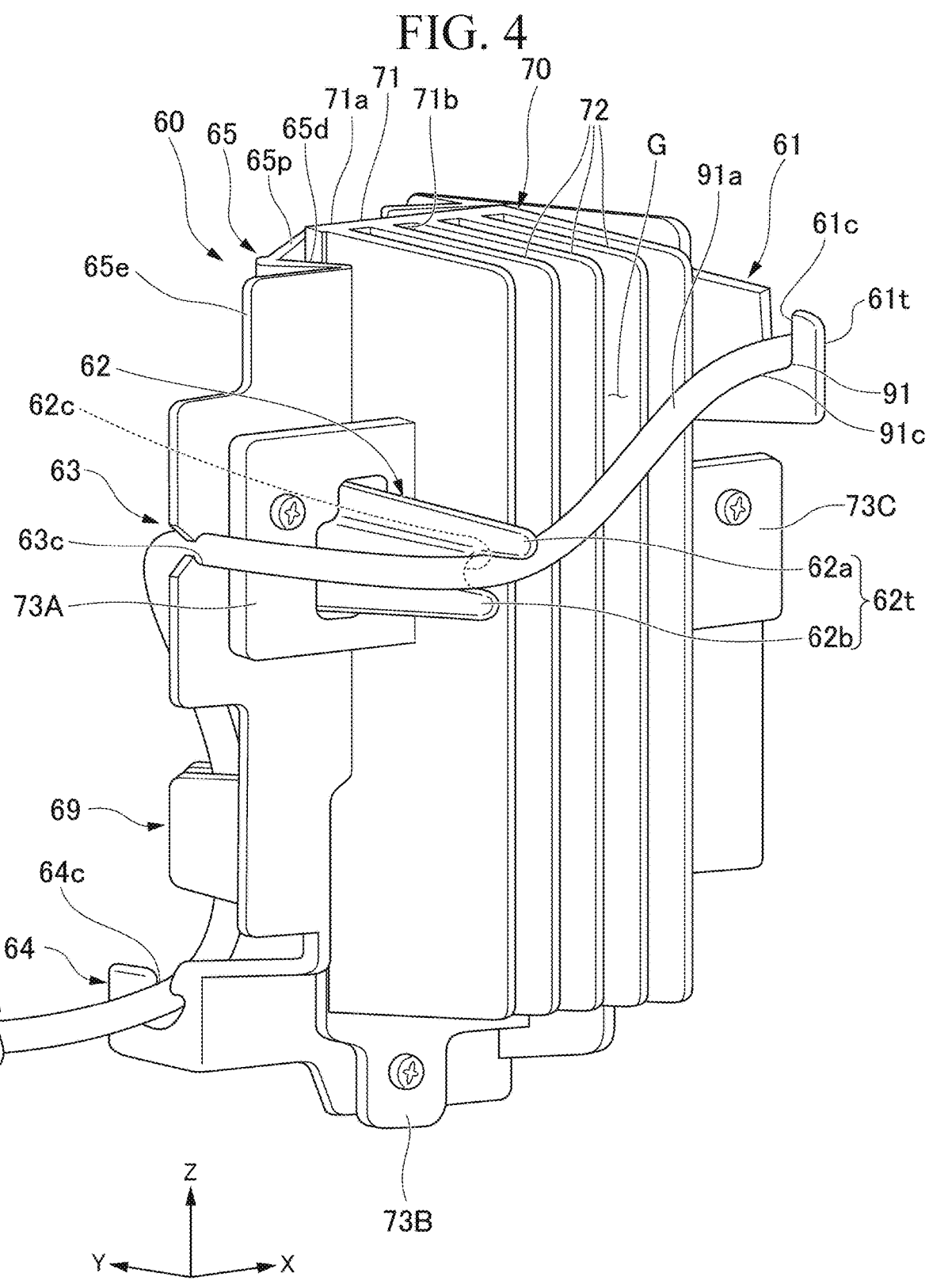
FIG. 4 is a perspective view of the light source device according to the vehicle lamp of the embodiment viewed obliquely from behind.

FIG. 4 is a perspective view of the light source device 50 viewed obliquely from behind.

The heat sink 70 is fixed to the bracket 60. The heat sink 70 has a base portion 71, a plurality of heat dissipation fins 72, and a plurality of fixing portions 73A, 73B, and 73C. The base portion 71 extends along a plane orthogonal to the forward-rearward direction Y. The base portion 71 has a cooling surface 71a directed to the forward side (+Y), and a heat dissipation surface 71b directed to the rearward side.

As shown in FIG. 2, the cooling surface 71a is a flat surface orthogonal to the forward-rearward direction Y. The cooling surface 71a comes into contact with the cooled surface 82e of the second board 82. In addition, the second board 82 is fixed to the cooling surface 71a. Accordingly, second board 82 is supported by the heat sink 70.

As shown in FIG. 4, the plurality of heat dissipation fins 72 protrude toward the rearward side (−Y) from the heat dissipation surface 71b. The plurality of heat dissipation fins 72 of the present embodiment have a plate shape extending along a plane orthogonal to the lateral direction X. The plurality of heat dissipation fins 72 are arranged in the lateral direction X. The shapes and disposition of the heat dissipation fins 72 are not limited to those in the present embodiment. For example, the heat dissipation fins 72 may have a pin shape. The heat sink 70 receives heat from the second board 82 on the cooling surface 71a and dissipates heat into the air through the heat dissipation fins 72. Accordingly, the heat sink 70 cools the second board 82.

The fixing portions 73A, 73B, and 73C have a plate shape orthogonal to the forward-rearward direction Y. The heat sink 70 of the present embodiment is provided with the three fixing portions 73A, 73B, and 73C. The three fixing portions 73A, 73B, and 73C are provided in the right end portion, the left end portion, and the lower end portion of the heat sink 70, respectively. The heat sink 70 is fixed to the bracket 60 with screws at the fixing portions 73A, 73B, and 73C.

The bracket 60 is constituted using a metal material. The bracket 60 is fixed to the housing 3 of the vehicle lamp 1. The bracket 60 supports the heat sink 70, the first board 81, the first cable 91, and the second cable 92.

The bracket 60 has a recessed portion recessed to the rearward side (−Y), and a flange portion 65e extending in the lateral direction and downward from an opening part of the recessed portion. The base portion 71 of the heat sink 70 and the front end portions of the heat dissipation fins 72 are accommodated in a recessed portion 65d. The flange portion 65e extends along a plane orthogonal to the forward-rearward direction Y. The fixing portions 73A, 73B, and 73C of the heat sink 70 are fixed to the flange portion 65e with screws. Accordingly, the heat sink 70 is supported by the bracket 60. In addition, the second board 82 is supported by the bracket 60 via the heat sink 70.

As shown in FIG. 3, the recessed portion has a main plate portion orthogonal to the forward-rearward direction Y and constituting the bottom part of the recessed portion, and a board support portion. A main plate portion 65p protects the mounting surface 82f of the second board 82 by covering it from the forward side (+Y). The main plate portion 65p is provided with a first penetration hole 65a, a second penetration hole 65b, and a third penetration hole 65c. The first penetration hole 65a overlaps the second light emitting element 52 when viewed from the forward side (+Y) and exposes the second light emitting element 52 to the forward side (+Y). The second penetration hole 65b overlaps the third light emitting element 53 and the second connector portion 82b when viewed from the forward side (+Y) and exposes the third light emitting element 53 and the second connector portion 82b to the forward side (+Y). The third penetration hole 65c overlaps the fourth light emitting element 54 when viewed from the forward side (+Y) and exposes the fourth light emitting element 54 to the forward side (+Y). In addition, the second connector portion 82b is disposed in the third penetration hole 65c.

As shown in FIG. 3, a board support portion 66 is connected to the right side (+X) with respect to the bracket 60. The board support portion 66 has a support surface 66e extending along the fixed surface 81e of a board main body 81a and coming into contact with the fixed surface 81e. The first board 81 is fixed to the support surface 66e with screws. Accordingly, the first board 81 is supported by the bracket 60.

The flange portion 65e is provided with a plurality of cable support portions 61, 62, 63, and 64 supporting the first cable 91 or the cable bundle 90, and a cable guide portion 69. That is, the bracket 60 has the cable support portions 61, 62, 63, and 64, and the cable guide portion 69.

As shown in FIG. 4, in the plurality of cable support portions 61, 62, 63, and 64, the first cable support portion 61, the second cable support portion 62, and the third cable support portion 63 support the first cable 91. The cable guide portion 69 guides the first cable 91. The fourth cable support portion 64 supports the cable bundle 90.

The first cable support portion 61 and the second cable support portion 62 protrude to the rearward side (−Y) from the flange portion 65*e* of a bracket main body portion 65. Both of the tip portions 61*t* and 62*t* of the first cable support portion 61 and the second cable support portion 62 are positioned rearward (−Y) than tip portions of the heat dissipation fins 72. The first cable support portion 61 is positioned on the right side (+X) of the heat sink 70. On the other hand, the second cable support portion 62 is positioned on the left side (−X) of the heat sink 70. That is, the first cable support portion 61 and the second cable support portion 62 are positioned on one side and the other side of the heat sink 70 respectively in the lateral direction X. In addition, in the present embodiment, the second cable support portion 62 is positioned slightly below (−Z) the first cable support portion.

The first cable support portion 61 of the present embodiment has a plate shape orthogonal to the lateral direction X. The tip portion 61*t* of the first cable support portion 61 is provided with a first cutout portion 61*c* opening to the upward side (+Z). That is, the first cable support portion 61 has the first cutout portion 61*c*. The first cable 91 is inserted into the first cutout portion 61*c*. Accordingly, the first cable 91 is supported by the first cable support portion 61. In the present embodiment, the width dimension of the first cutout portion 61*c* is slightly larger than the wire diameter of the first cable 91. For this reason, the inner edge of the first cutout portion 61*c* does not press against the first cable support portion 61, and it is possible to suppress a load on the first cable support portion 61.

The tip portion 62*t* of the second cable support portion 62 of the present embodiment is provided with a first protruding portion 62*a* and a second protruding portion 62*b*. That is, the second cable support portion 62 has the first protruding portion 62*a* and the second protruding portion 62*b*. Both of the first protruding portion 62*a* and the second protruding portion 62*b* protrude to the rearward side (−Y). That is, the first protruding portion 62*a* and the second protruding portion 62*b* protrude in the same direction. A second cutout portion 62*c* opening to the rearward side (−Y) is formed between the first protruding portion 62*a* and the second protruding portion 62*b*. That is, the second cable support portion 62 has the second cutout portion 62*c*.

The first cable 91 is inserted into the second cutout portion 62*c*. Accordingly, the first cable 91 is supported by the second cable support portion 62. In the present embodiment, the width dimension of the second cutout portion 62*c* is slightly larger than the wire diameter of the first cable 91. For this reason, similar to the first cable support portion 61, the inner edge of the second cutout portion 62*c* does not press against the second cable support portion 62.

In the first cable 91 of the present embodiment, the heat-resistant cover 91*c* is provided at a part supported by the first cable support portion 61 and the second cable support portion 62. For this reason, the wire diameter of the first cable 91 at the parts supported by the first cable support portion 61 and the second cable support portion 62 are the wire diameter of the first cable 91 in a state of being covered by the heat-resistant cover 91*c*. In addition, when the first cable 91 is not covered by the heat-resistant cover 91*c*, the width dimensions of the first cutout portion 61*c* and the second cutout portion 62*c* need only be larger than the wire diameter of the first cable 91 in a state of not being covered by the heat-resistant cover 91*c*.

The first cable 91 has a wire portion 91*a* laid in the lateral direction X between the first cable support portion 61 and the second cable support portion 62. The wire portion 91*a* faces the heat sink 70 with a gap G therebetween. According to the present embodiment, since the first cable 91 is supported by the bracket 60 on both sides of the heat sink 70 in the lateral direction X, a situation in which the first cable 91 comes into contact with the bracket can be suppressed. For this reason, even if the heat sink 70 is at a high temperature, it is possible to suppress occurrence of damage to the first cable 91 due to heat of the heat sink 70. Moreover, even if the heat sink 70 has sharp corner portions, it is possible to suppress damage to the first cable by the corner portions.

In the present embodiment, the bracket 60 has the recessed portion 65*d* recessed to the forward side (+Y) and accommodating the heat sink 70, and the first cable support portion 61 and the second cable support portion 62 positioned on one side and the other side of the recessed portion 65*d* respectively in the lateral direction X and protruding to the rearward side (−Y). According to the present embodiment, the bracket 60 can protect the heat sink 70 by accommodating the heat sink 70 in the recessed portion 65*d*. In addition, according to the present embodiment, since the heat sink 70 is accommodated in the recessed portion 65*d*, it is possible to shorten the entire lengths of the first cable support portion 61 and the second cable support portion 62 further extending to the rearward side beyond the end portion of the heat sink 70 on the rearward side (−Y). Accordingly, the first cable support portion 61 and the second cable support portion 62 are less likely to vibrate, and the first cable 91 can be stably supported by the first cable support portion 61 and the second cable support portion 62.

In the present embodiment, the second cable support portion 62 is positioned below (−Z) the first cable support portion 61. For this reason, the first cable 91 extends downward toward the second cable support portion 62 from the first cable support portion 61.

In the present embodiment, the opening direction of the first cutout portion 61*c* (upward (+Z)) and the opening direction of the second cutout portion 62*c* (rearward (−Y)) are directions intersecting each other. When the cable is supported by cutout portions such as the first cutout portion 61*c* and the second cutout portion 62*c*, the cable is likely to come off in the opening direction of the cutout portions. According to the present embodiment, the direction in which the first cable 91 is likely to come off in the first cable support portion 61 and the direction in which the first cable 91 is likely to come off in the second cable support portion 62 can be caused to intersect each other. As a result, even if vibration is applied to the bracket 60, the first cable 91 is less likely to be separated from the bracket 60. According to the present embodiment, supporting the first cable 91 by the bracket 60 can be made stable.

As shown in FIG. 4, the first protruding portion 62*a* and the second protruding portion 62*b* are disposed in a manner of being shifted in the lateral direction X. For this reason, the first protruding portion 62*a* and the second protruding portion 62*b* come into contact with the first cable 91 at positions shifted from each other in the extending direction (lateral direction X) of the first cable 91. According to the second cable support portion 62 of the present embodiment, the first cable 91 can be smoothly routed when the direction of routing the first cable 91 is changed by the second cable support portion 62. More specifically, in the second cable support portion 62 of the present embodiment, the first protruding portion 62a restrains the first cable 91 from above (+Z), and the second protruding portion 62b restrains the first cable 91 from below (−Z). Accordingly, the second cable support portion 62 can bend the first cable 91. As a result, the second cable support portion 62 can route the first cable 91 in a direction in which it tilts to the upward side (+Z) on the right side (+X) of the second cable support portion 62 and can route the first cable 91 in the lateral direction X on the left side (−X) of the second cable support portion 62, and therefore the first cable 91 can be smoothly routed.

According to the present embodiment, the first cutout portion 61c supports the first cable 91 from below (−Z). The first protruding portion 62a supports the first cable 91 from above (+Z). The second protruding portion 62b supports the first cable 91 from below (−Z). In addition, the first protruding portion 62a is positioned between the first cutout portion 61c and the second protruding portion 62b in the lateral direction X. Therefore, in the extending direction of the first cable 91, the first cable 91 is supported by each portion of the bracket 60 in the upward-downward direction Z alternately in the order of the downward direction, the upward direction, and the downward direction. Accordingly, even if the bracket 60 receives vibration, it is easier to hold the first cable 91 and the separation of the bracket 60 from the first cable 91 can be suppressed.

The third cable support portion 63 is provided in the end portion of the flange portion 65e on the left side (−X). The third cable support portion 63 has a plate shape orthogonal to the forward-rearward direction Y. The third cable support portion 63 has a third cutout portion 63c opening to the left side (−X). The first cable 91 is inserted into the third cutout portion 63c. The width dimension of the third cutout portion 63c is larger than the wire diameter of the first cable 91 in the deep part of the opening and is smaller than the wire diameter of the first cable 91 in the opening part. Accordingly, the third cutout portion 63c can hold the first cable 91. The first cable 91 is routed in the forward-rearward direction Y by being supported by the third cutout portion 63c.

As shown in FIG. 3, the cable guide portion 69 is positioned below the third cable support portion 63. The cable guide portion 69 has a pair of guide plates 69a. The pair of guide plates 69a protrude to the forward side with respect to a surface directed to the forward side (+Y) of the main plate portion 65p. The pair of guide plates 69a extend in a manner of being orthogonal to the lateral direction X and are arranged in the lateral direction X. The first cable 91 passes between the pair of guide plates 69a. The cable guide portion 69 guides the first cable 91 supported by the third cable support portion 63 toward the downward side.

The fourth cable support portion 64 is positioned below the cable guide portion 69. The fourth cable support portion 64 protrudes to the forward side from the main plate portion 65p. The fourth cable support portion 64 has a fourth cutout portion 64c opening upward. The cable bundle 90 is inserted into the fourth cutout portion 64c. Accordingly, the fourth cable support portion 64 supports the first cable 91 and the second cable 92 bundled on the forward side (+Y) of the second board 82.

The first cable 91 bends to the left side (−X) on the downward side (−Z) of the cable guide portion 69 and passes the fourth cutout portion 64c from the right side (+X) to the left side (−X). The second cable 92 extends outward to the forward side (+Y) from the second board 82, bends to the left side (−X), is bundled with the first cable 91, and passes the fourth cutout portion 64c from the right side (+X) to the left side (−X) together with the first cable 91. Therefore, the first cable 91 is bundled with the second cable 92 at the tip side than the parts supported by the first cable support portion 61 and the second cable support portion 62.

In the present embodiment, the wire portion 91a is positioned behind (−Y) with respect to the heat sink 70. According to the present embodiment, compared to when the wire portion 91a is positioned above or behind the heat sink 70, the light source device 50 can be reduced in size in the upward-downward direction. It is generally known that air convection occurs above and below the heat sink 70 as the heat sink 70 dissipates heat. According to the present embodiment, since the wire portion 91a passes the rearward side (−Y) of the heat sink 70, the first cable 91 does not disrupt the convection around the heat sink 70, and therefore deterioration in heat dissipation efficiency of the heat sink 70 can be suppressed. Particularly, high-temperature air heated by heat dissipation from the heat dissipation fins 72 passes through the upward side of the heat sink 70. According to the present embodiment, the first cable 91 is not heated by high-temperature air, and the reliability of the first cable 91 can be enhanced.

Modification Example

Figure 5:
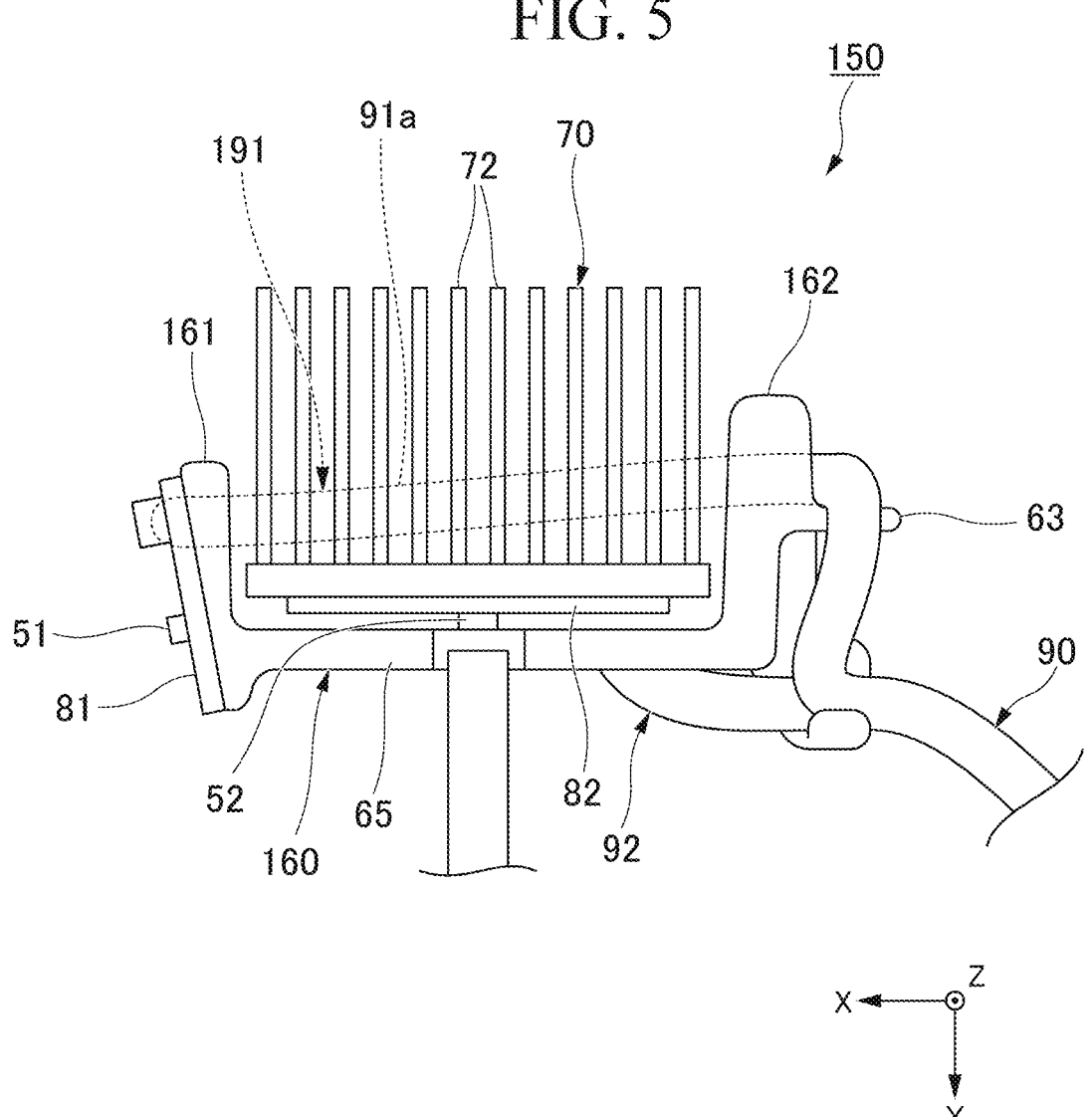
FIG. 5 is a plan view of a light source device of a modification example.

FIG. 5 is a plan view of a light source device 150 of a modification example which can be employed in the embodiment described above. The light source device 150 of the present modification example mainly differs in configurations of a first cable support portion 161 and a second cable support portion 162. The same reference signs are applied to constituent elements having the same form as those in the embodiment described above, and description thereof will be omitted.

A bracket 160 of the present modification example has the bracket main body portion 65, the first cable support portion 161, and the second cable support portion 162. The first cable support portion 161 and the second cable support portion 162 extend downward from the bracket main body portion 65 and support a first cable 191 in the lower end portion. In the present modification example, the wire portion 91a of the first cable 191 faces the heat sink 70 in the upward-downward direction with a gap therebetween. According to the present modification example, similar to the embodiment described above, a situation in which the first cable 191 comes into contact with the bracket can be suppressed. In addition, in the present modification example, the wire portion 91a is positioned below (−Z) the heat sink 70. For this reason, increase in size of the light source device 150 in the forward-rearward direction Y can be suppressed.

In the present modification example, a case in which the wire portion 91a is positioned below the heat sink 70 has been described, but the first cable 191 may be positioned above the heat sink 70. In this case, the first cable 191 is disposed sufficiently far away from the heat sink 70 so as not to be affected by the air heated by the heat sink 70.

Hereinabove, an embodiment of the present invention and a modification example thereof have been described, but each of the configurations, combinations thereof, and the like in the embodiment and the modification example are merely examples, and addition, omission, replacement, and other changes of the constitution can be made within a range not departing from the scope of the present invention. In addition, the present invention is not limited by the embodiment.

For example, in the embodiment described above, a headlight has been adopted as an example of the vehicle lamp according to the present invention, but the vehicle lamp according to the present invention may be applied to lamps for other purposes.

The light source device of the embodiment described above does not have a heat sink for cooling the first board. However, depending on the number and the purpose (light emission time) of light emitting elements mounted on the first board, a heat sink for cooling the first board may be provided. In this case, the heat sink may be provided separately from that for cooling the second board. In addition, the heat sink for cooling the first board may also be shared as that for cooling the second board.

In the embodiment described above, a case in which the width dimension of the cutout portion in each of the first cable support portion and the second cable support portion is slightly larger than the wire diameter of the first cable has been described. However, the width dimensions of the cutout portions therein may be slightly smaller than the wire diameter of the first cable. In this case, the cutout portions can grasp the first cable so that separation of the first cable from the cutout portion is suppressed. In the embodiment described above, description of an outer lens and a reflector provided in the vehicle lamp is omitted. For example, the outer lens and the reflector are fixed to the extension.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle lamp comprising:
a bracket;
a heat sink supported by the bracket;
a first board that is supported by the bracket and on which a first light emitting element is mounted on one surface of the first board;
a second board that is supported by the heat sink, on which a second light emitting element is mounted on one surface of the second board, and that irradiates light in a first direction; and
a first cable supported by the first board,
wherein the bracket has a first cable support portion and a second cable support portion, the first cable support portion supporting the first cable on one side in a second direction orthogonal to the first direction, and the second cable support portion supporting the first cable on the other side in the second direction, and the first cable is supported to the bracket by the first cable support portion and the second cable support portion via a gap between the first cable and the heat sink.

2. The vehicle lamp according to claim 1,
wherein the first cable support portion has a first cutout portion into which the first cable is inserted,
the second cable support portion has a second cutout portion into which the first cable is inserted, and
an opening direction of the first cutout portion and an opening direction of the second cutout portion are directions intersecting each other.

3. The vehicle lamp according to claim 2,
wherein the second cable support portion has a first protruding portion and a second protruding portion protruding in a same direction with each other, and the second cutout portion is formed between the first protruding portion and the second protruding portion, and
the first protruding portion and the second protruding portion are disposed while being shifted in the second direction.

4. The vehicle lamp according to claim 3,
wherein the first cutout portion opens upward and supports the first cable from below,
the first protruding portion is positioned between the first cutout portion and the second protruding portion in the second direction and supports the first cable from above, and
the second protruding portion supports the first cable from below.

5. The vehicle lamp according to claim 1 further comprising:
a second cable supported by the second board; and
a terminal portion connected to a connector portion,
wherein the first cable is bundled with the second cable at a tip side compared to parts supported by the first cable support portion and the second cable support portion and is connected to the terminal portion together with the second cable.

6. The vehicle lamp according to claim 1,
wherein the bracket has
a recessed portion recessed in the first direction, and
the first cable support portion and the second cable support portion which are positioned on one side and other side of the recessed portion respectively in the second direction and which protrude to an opposite side of a recess direction of the recessed portion, and
the heat sink is disposed while being accommodated in the recessed portion.

7. The vehicle lamp according to claim 1,
wherein a wire portion of the first cable laid between the first cable support portion and the second cable support portion is positioned on one side in the first direction with respect to the heat sink.

* * * * *